United States Patent Office 3,112,026
Patented Nov. 26, 1963

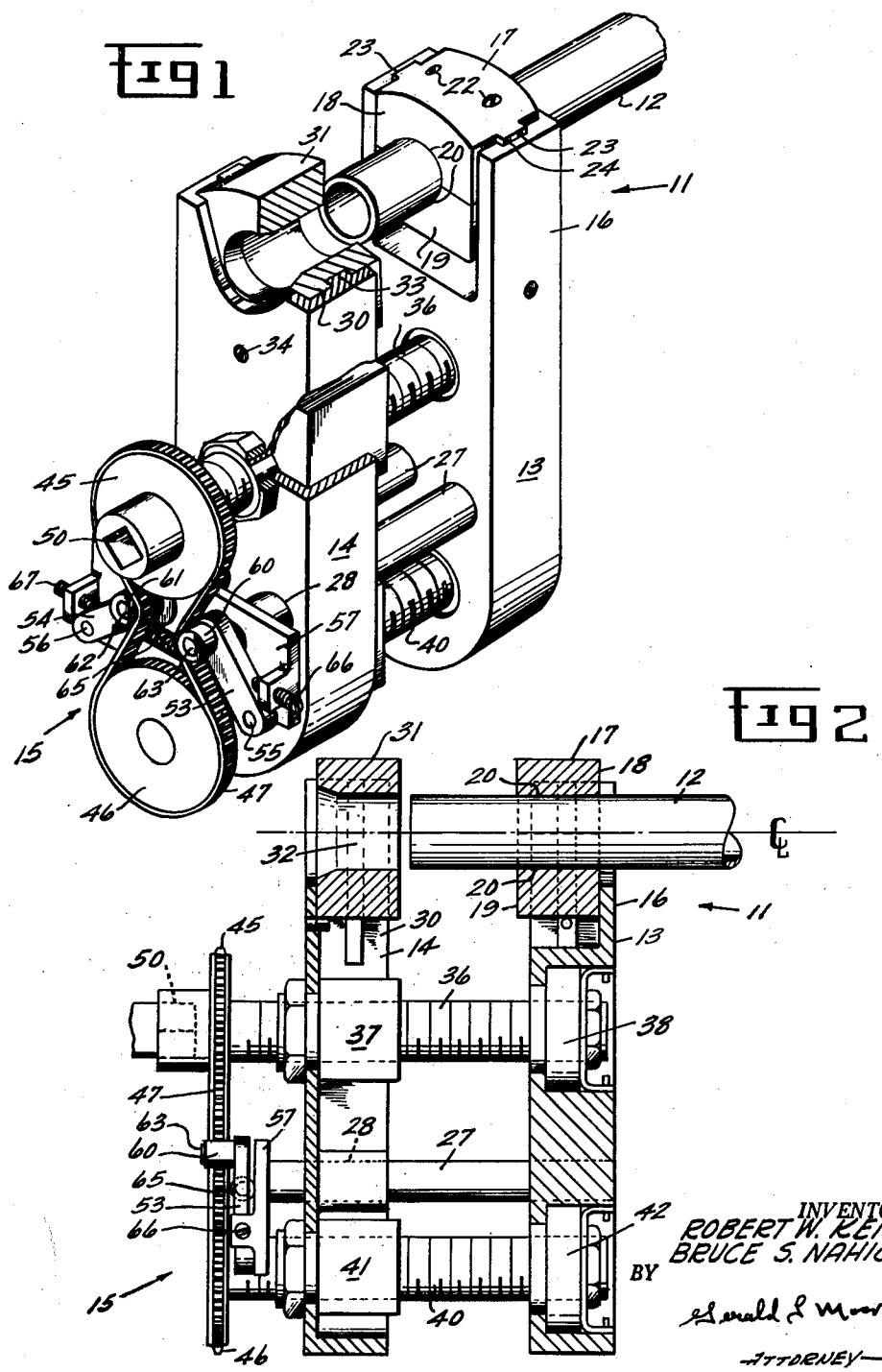

3,112,026
TUBE SIZING TOOL
Robert W. Keiter and Bruce S. Nahigyan, Cincinnati, Ohio, assignors to General Electric Company, a corporation of New York
Filed Dec. 5, 1961, Ser. No. 157,072
2 Claims. (Cl. 205—4)

This invention relates to a tube sizing tool and, more particularly, to a tool particularly adapted for sizing the outer diameters of tubes in preparation for brazing or joining the tubes to some type of connector.

In joining tubes or conduits to various connectors and, in particular, in joining such tubes by brazing or soldering to a connector extending around the outside diameter of the tube, it is important that the outside dimensions of the tube be maintained within specified tolerances to assure the proper clearances between the tube and the connector and allow for proper distribution of the brazing alloy or solder being used to join the pieces. The problem is more acute where a tube is to be brazed that has been used previously, i.e., one from which a connector has been removed thereby changing the outer dimensions of the tube. It is important, therefore, to resize the tube to the proper dimensions prior to performing the brazing operation to assure a good joint between the pieces.

However, since such a resizing operation at times must be performed with the tubes still in place or connected onto the apparatus on which they are used, the working space available is frequently limited making it extremely difficult to perform the resizing or sizing operation. Previous tools for performing this task have generally been large or cumbersome and not easily portable, thereby requiring that the workpieces be brought to them for sizing making it difficult or impossible to size the tubes with one end remaining attached to the apparatus on which it is to be used.

Accordingly, a primary object of the present invention is to provide an improved sizing tool which is completely portable and small enough to allow its use in limited space areas.

Another object of this invention is to provide a sizing tool having an accurate drive mechanism to allow precise sizing of the tube or conduit.

According to one aspect of the invention, there is provided a small, compact sizing tool having a clamping member which may be clamped onto the tube being sized and a sizing head member which may be forced over or into the tube to size the diameter thereof, with an accurate driving mechanism for bringing the clamping member and sizing head member together to accurately size the tube. The drive mechanism includes means for compensating for play in the driving mechanism due to normal tolerances of the drive mechanism components to maintain the members in alignment and to allow for accurate sizing of the tube.

The invention will be better understood from the following description taken in connection with the accompanying drawings and its scope will be pointed out in the appended claims.

In the drawings:

FIG. 1 is a perspective view of the sizing tool with the tube being sized clamped therein, FIG. 2 is a side view of the sizing tool, partially in section.

Referring now to the drawings, there is illustrated the clamping tool 11 placed on a tube 12, the end of which is to be sized. The tool includes a clamping member 13, the die support member 14, and the drive mechanism 15. The clamping member 13 has a channeled end 16 forming a U-shaped support for the clamping jaw 17 which fits around the workpiece. The jaw 17 comprises two sections 18 and 19 each having a cut-out portion 20 which, when the jaws are fitted together in the manner illustrated, fit around the periphery of the tube to clamp the tube in position. The clamping force is provided by screw members 22 which may be tightened to force the jaw members 18 and 19 together around the periphery of the tube. Naturally, the opening 20 must be slightly smaller than the outside diameter of the tube 12 in order to provide a clamping fit on the tube. Projections 23 on the opposite edges of the clamping jaws interfit with the grooves 24 in the clamping member 13 to prevent movement of the clamping jaws in the direction of the longitudinal axis of the tube 12. By supporting the clamping jaws and the clamping member 13 in this manner, the clamping jaws may be interchangeable and also may be fitted around the tube and tightened into position prior to insertion into the sizing tool for the sizing operation.

The die support member 14 is supported in spaced relationship with the clamping member 13 and held in alignment by the cylindrical guides 27 attached to the clamping member 13 and extending through openings 28 in the member 14. This die support member 14 includes a cut-out portion 30 into which fits a die member 31 held against longitudinal movement by the tongue and groove structure 33. This method of supporting the die member allows for use of interchangeable dies so that the same basic tool may be used with a series of dies of different sizes in the same manner as the clamping member. Furthermore, the die members 31 and clamping jaw 17 are symmetrical about a horizontal axis so as to fit into the tool either way. Also, mandrels for sizing the internal diameters of tubes can be employed in this tool, if desired. A screw member 34 in threaded engagement with the die member 14 may be inserted in the die support member to position the die in the tool.

The drive mechanism 15 is supported on the guides 27 and includes a first threaded screw member 36 extending through a threaded socket 37 and terminating at the bearing socket 38 supported on the clamping member 13. Similarly, a second threaded screw member 40 extends through a threaded socket 41 in member 14 and at the bearing socket 42 in member 13. It may be seen that by having cooperating screw threads on the internal radius of the sockets 37 and 41 which coact with the screw threads on the screw members 36 and 40, by simultaneous rotation of the screw members the die support member 14 may be moved to and from the clamping member 13. The guide members 27 guide the die support member in its travel.

To rotate the screw members, sprockets 45 and 46 are attached to the screw members and joined by chain 47 extending around the periphery of both for the simultaneous driving of the sprockets and therefore the screw members by inserting a driving tool into a drive recess 50 in sprocket 45. However, to size the workpiece it is essential that the workpiece enter the die member parallel to the opening within the die member. To do this, the die members 14 and clamping member 13 must remain parallel while being moved together. In drive mechanisms such as the one employed it has been found that the members remain parallel until loaded or until the workpiece reaches the die, then the resistance to movement encountered as the workpiece enters the die member causes the members 13 and 14 to become canted, i.e. the workpiece ends are forced further apart than the drive ends due to the play in the drive mechanism. If such occurs, the tube 12 will enter the opening 32 in a slightly canted position and precision sizing will not be effected.

To overcome this difficulty, the invention incorporates in the drive mechanism the pivoted arms 53 and 54 which pivot about the pins 55 and 56 supported from the plate 57 which is in turn supported on the guide member 27. On the ends of the pivot arms 53 and 54 are located rollers 60 and 61 supported on pins 62 and 63 for rotation. A spring member 65 is attached between the pivot arms 53 and 54 with the screw members 66 and 67 serving as stops to limit the outward pivoting of the pivot arms. By this assembly, the spring member 65 serves to force the rollers 60 and 61 against the chain 47.

Now to explain the operation of the sizing tool and drive mechanism, assume that the tube has been clamped in position as illustrated and is ready for the sizing operation. A driving tool is inserted in the socket 50 to rotate the sprocket 45, drive the chain 47 and thereby also rotate the sprocket 46. The screw members 36 and 40 are rotated and the die member 14 is moved toward the clamping member 13 and therefore the die 31 is moved toward the workpiece 12. The subject invention incorporates the specific drive mechanism wherein when the sprocket 45 starts to revolve, the chain immediately drives the sprocket 46 with the chain rolling around the rollers 60 and 61 as illustrated. However, when the tube end reaches the die, which would ordinarily result in the canted movement as pointed out heretofore, the resistance against the members 13 and 14 moving together caused by the forcing of the workpiece 12 in the die opening 32 results in a greater strain or tension placed on the chain 47. The tension side of the chain, for instance that adjacent the roller 60, then carries more load and the pivot member 53 will tend to straighten and move outward with the spring 65 moving roller 62 inward by the same amount therefore allowing for a slight lag in the driving of the sprocket 46 with respect to the sprocket 45. This slight lag allows the die and clamping ends of the members 13 and 14 to be driven by a slight increment further than the opposite ends thereby taking up the play in the drive mechanism and maintaining the members parallel thereby allowing the tube end to enter the die in the normal desired manner. The forcing of the tube in such a die, cold works the tube to the dimensions of the die and sizes the tube as desired. Of course when the tube is sized and it is desired to remove the tube from the die, the exact opposite action occurs in the drive mechanism in that the other roller 62 is forced outward by the tension on that side of the chain thereby allowing the die and clamping ends of the members to be driven slightly ahead and taking up play in the drive mechanism in the opposite direction.

It can be seen that by use of the drive compensating mechanism in tools where it is desired that the members be maintained in an exact relationship, as in a sizing tool, a standard drive means can be utilized having normal manufacturing tolerances and therefore providing a slight amount of play in the mechanism and by use of this compensating mechanism, the members are still driven in their exact relationship as desired. The adjusting screws 66 and 67 limit the outward travel of the rollers and therefore adjust the compensating mechanism in either direction of travel individually and to the precise deflection needed to compensate for the slack or play present in the drive mechanism.

While a particular embodiment of the invention has been illustrated and described, it will be obvious to those skilled in the art that various changes and modifications may be made without departing from the invention and it is intended to cover in the appended claims all such changes and modifications that come within the true scope and spirit of the invention.

What we claim as new and desire to secure by Letters Patent of the United States is:

1. An apparatus for sizing tubes comprising
    a clamping member for attachment to the tube,
    a die member for sizing a dimension of said tube by being forced into contact with said tube,
    a drive mechanism for moving said members together comprising a pair of screw threaded drive shafts laterally disposed to one side of said tube being sized and extending through and threadably engaging one member and rotatably attached to said other member,
    a sprocket attached to each shaft,
    a drive chain extending around and engaging said sprockets for simultaneous rotation of said shafts,
    a pair of spring biased levers mounted to bear against said drive chain at each point where it extends between said sprockets to deflect said chain from direct alignment between said sprockets,
    such that when said drive chain is loaded said portion of the chain extending between the sockets being in tension will tend to straighten against the forces of said lever and cause a slight differential rotation between the sockets to compensate for play in said drive mechanism and maintain said members in alignment.

2. The apparatus for sizing tubes as recited in claim 1 in combination with adjustable stop means for each spring biased lever.

References Cited in the file of this patent

UNITED STATES PATENTS

| | | |
|---|---|---|
| 290,600 | Palmer | Dec. 18, 1883 |
| 1,871,268 | Hildebrand | Aug. 9, 1932 |
| 1,912,751 | Batcheller | June 6, 1933 |
| 2,703,925 | Peck | Mar. 15, 1955 |
| 2,875,842 | Morrell | Mar. 3, 1959 |
| 2,998,125 | Hahn et al. | Aug. 29, 1961 |